UNITED STATES PATENT OFFICE.

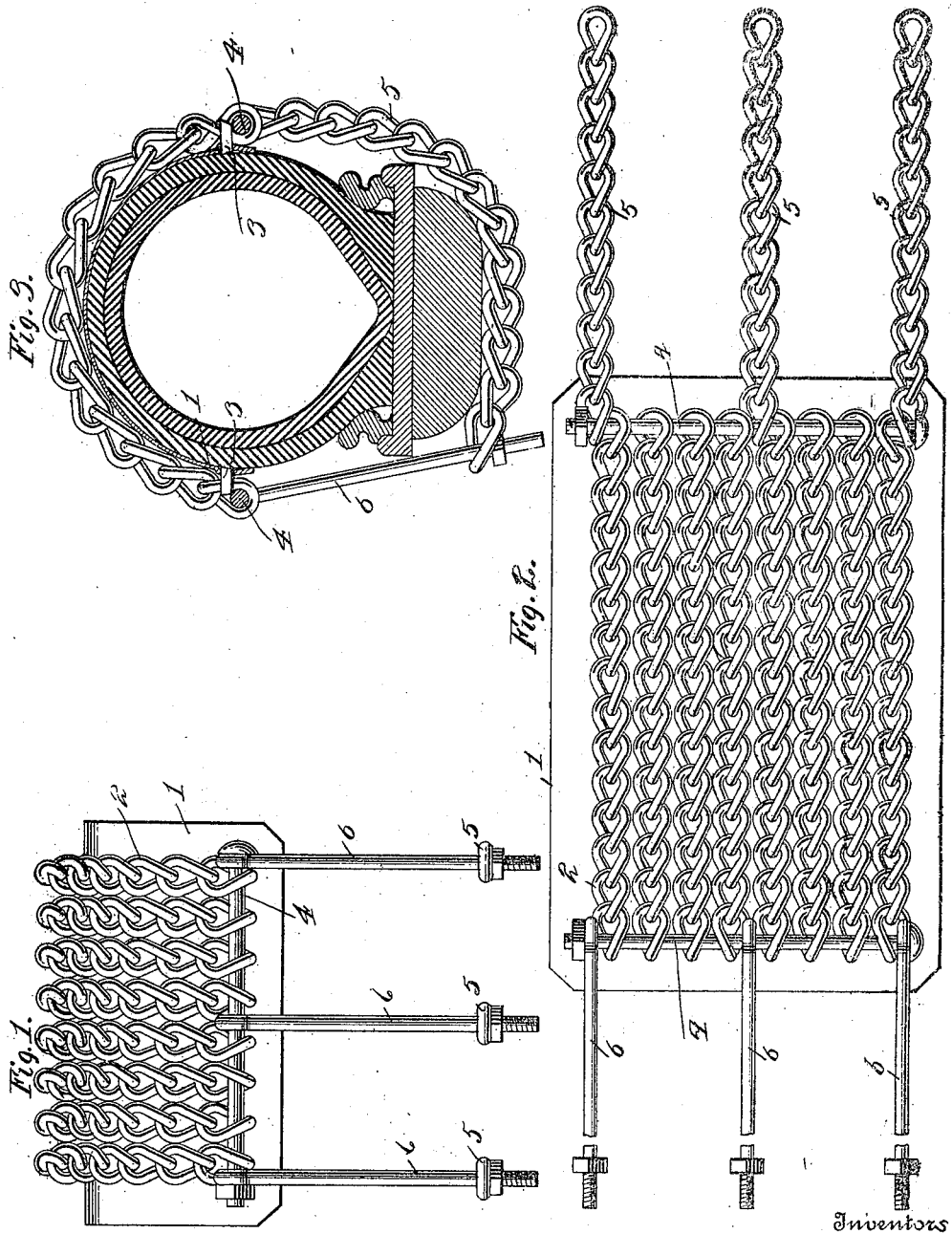

MICHAEL COPPS AND ARCHIE B. CREWDSON, OF CHARTER OAK, IOWA.

BLOW-OUT PATCH.

1,165,322.  Specification of Letters Patent.  Patented Dec. 21, 1915.

Application filed July 2, 1913. Serial No. 777,030.

*To all whom it may concern:*

Be it known that we, MICHAEL COPPS and ARCHIE B. CREWDSON, citizens of the United States, residing at Charter Oak, in the county of Crawford and State of Iowa, have invented new and useful Improvements in Blow-Out Patches, of which the following is a specification.

The invention provides a device to be fitted to a pneumatic tire when the same suffers an opening by reason of a puncture, blow-out or other cause to close such opening until permanent repairs may be made.

The invention provides a patch embodying a facing comprising a plurality of connected chains, a packing of leather, textile or like flexible material, and binding means for securing the patch about the tire and rim of the vehicle wheel.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a detail view, showing the application of the invention. Fig. 2 is a detail view of the patch as seen from the tread side. Fig. 3 is a sectional view.

Corresponding and like parts are referred to in the following description, and indicated in all the views of the drawing, by the same reference characters.

The patch comprises a backing 1 of leather, textile, or other flexible material which will readily conform to the surface of the tire to be protected. A facing 2 covers the outer or tread side of the patch and consists of a plurality of short chains arranged in close relation so as practically to cover the entire surface of the backing 1. The short chains comprising the facing 2 are arranged to extend transversely about the tire when the patch is in position. The chains protect the backing 1 and provide a surface to the patch which is wear resisting and at the same time perfectly flexible so as to conform to the surface of the tire and admit of the same yielding when passing over a stone or like obstruction. The chains are secured at their ends to the backing 1 by fastening means 3 of any nature. In the preferred form the fastening means 3 consist of a lashing or lacing which passes through terminal links of the chains and through openings formed in the backing 1. Rods 4 pass through the terminal links of the chains, thereby connecting such chains and providing convenient means for the application of binding means whereby the patch is secured to the tire when in active position. The rods 4 preferably consist of slender bolts, which are retained in place by the heads at one end of the bolts and the nuts fitted to the opposite end of the bolts. Binding chains 5 have their terminal links engaged with one of the rods 4 and eye bolts are mounted upon the other one of the rods 4, such rod passing through the eyes of the bolts 6. When the patch is in position the stems of the eye bolts pass through links of the corresponding binding chains 5, the patch being secured about the tire and rim of the vehicle wheel by screwing the nuts 7 upon the threaded ends of the eye bolt 6, thereby drawing the patch about the tire and rim tightly.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claim appended hereto.

Having thus described the invention what is claimed as new, is:—

As an improved article of manufacture a patch for pneumatic tires, the same comprising a plurality of chains arranged close together in parallel relation, a flexible backing of larger dimensions than the space covered by the chains and secured near its ends to terminal links of the chains, rods passing through the terminal links of the chains, a number of eye bolts slipped upon one of the said rods and spaced apart by means of the chains, and a corresponding number of binding chains slipped upon the other one of the rods and held in proper position by the facing chains.

In testimony whereof we affix our signatures in presence of two witnesses.

MICHAEL COPPS.
ARCHIE B. CREWDSON.

Witnesses:
  A. FISK,
  F. T. THOMSEN.